No. 728,696. PATENTED MAY 19, 1903.
F. G. FRANKENBERG & A. P. MILLER.
HOSE COUPLING.
APPLICATION FILED NOV. 12, 1901.
NO MODEL.
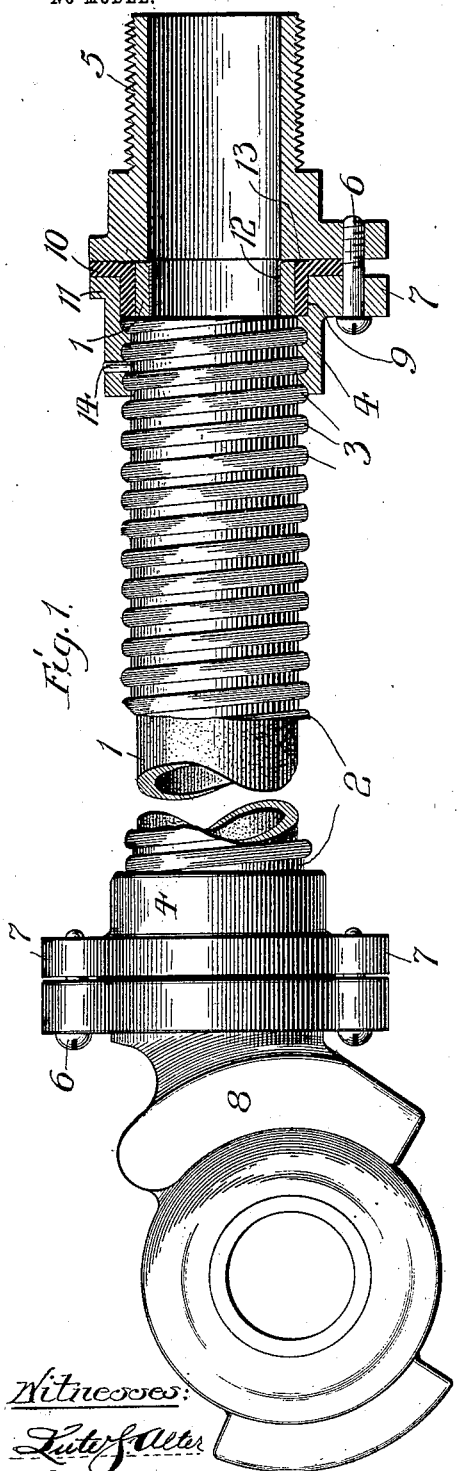
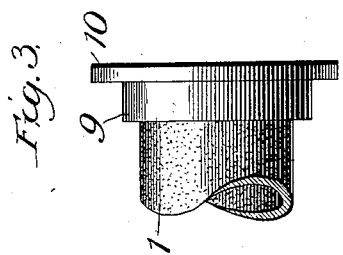
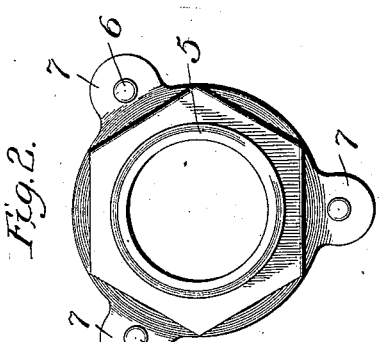
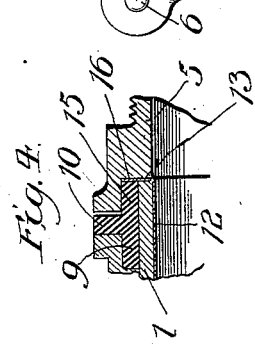
Witnesses:
Luty f Alts.
Louis B. Erwin.
Inventors
Frederick G. Frankenberg
and Alfred P. Miller,
By Rector & Hibben
Attys.

No. 728,696. Patented May 19, 1903.

UNITED STATES PATENT OFFICE.

FREDERICK G. FRANKENBERG AND ALFRED P. MILLER, OF CHICAGO, ILLINOIS, ASSIGNORS TO FLEXIBLE ARMORED HOSE COMPANY, OF CHICAGO, ILLINOIS, A CORPORATION OF ILLINOIS.

HOSE-COUPLING.

SPECIFICATION forming part of Letters Patent No. 728,696, dated May 19, 1903.

Application filed November 12, 1901. Serial No. 82,007. (No model.)

*To all whom it may concern:*

Be it known that we, FREDERICK G. FRANKENBERG and ALFRED P. MILLER, citizens of the United States, residing in Chicago, in the county of Cook and State of Illinois, have invented certain new and useful Improvements in Hose-Couplings, of which the following is a description, reference being had to the accompanying drawings, forming a part of this specification.

Our invention relates to hose-couplings for conducting any fluid, whether air, steam, or the like, and is particularly useful for air-brake and signal-pipe and also steam-pipe hose-couplings on railway-trains and is as well applicable to couplings for hose used in connection with pneumatic tools, power-hammers, drills, &c.

In general terms the object of our invention is to provide a more efficient and durable coupling of the character described containing features of utility without increasing the cost as compared with the standard hose-couplings.

Our hose-coupling is of the armored type, and the novel features thereof pertain more especially to the joint or connection members at the ends thereof.

For convenience in description our invention is here shown as applied to a hose-coupling for the brake-pipe of a railway-train; but it is to be understood that the invention is not restricted to such particular application.

In the drawings, Figure 1 is an elevation, partly in section, showing our invention applied to an air-brake hose; Fig. 2, an elevation of the right-hand end of the parts shown in Fig. 1; Fig. 3, an elevation of the combined hose and gasket, and Fig. 4 an elevation of a modified form of hose and gasket.

The hose 1, of desired length and dimensions, is surrounded by a suitable armor 2, which, as shown, is of such formation as to provide screw-threads 3, which are received by corresponding internal screw - threads formed in a sleeve 4, screwing onto both ends of the hose, as clearly illustrated in Fig. 1. For fastening the sleeve onto the train-pipe connection 5 screws 6, passing through lugs 7 on the sleeve, may be used, although any other suitable means may be adopted, and likewise, in the present instance illustrating an air-brake hose, the other sleeve is secured to a coupling-head 8. Each end of the hose has vulcanized, cemented, or otherwise secured thereto the gasket 9, which in both forms herein shown has a right-angled flange portion 10 on the plane of the end of the hose. As stated, this gasket is vulcanized, cemented, or otherwise secured to the hose and is therefore integral therewith, so that there results a combined hose and gasket. The gasket is of such diameter as to fit snugly within the sleeve, with its flange 10 resting upon the flange 11 of the sleeve.

By the forming of the hose and the gasket in an integral structure, in the present instance by vulcanizing the gasket to the hose, important advantages are obtained, in that a perfectly-tight joint is secured between the coupling-head and the hose or pipe. It is an easy matter to obtain a tight joint at the flange of a gasket between the two heads, because pressure can be brought to bear upon such flange; but as pressure is not brought against the body or cylindrical portion of the gasket around the hose leakage of pressure would be liable to occur longitudinally of the pipe and between it and the gasket unless such gasket formed a part of the hose itself, as herein shown, in which case the leakage referred to is absolutely prevented. The employment of our resilient gasket integral with the hose produces, in fact, a most practical and desirable structure. Furthermore, our invention pertains to a flexible hose, especially to that kind like hose-couplings for railroad use in connection with the steam-heating and air-brake systems, where the hose is liable to be flexed and to be moved considerably with respect to the coupling-heads, which are generally fixed. Consequently conditions require a flexible gasket, as well as a flexible hose, and also require the combining of the gasket with the hose, for the reasons above explained.

In order to prevent or resist any inward pressure on the hose when the joint is made or drawn together tightly, which pressure would of course cause an inward bulging of the hose and a consequent restriction of its passage, we prefer to use a metallic ferrule 12, whose body portion lines the pipe inwardly from each end for a short distance and whose right-angled flange 13 lies over the ends of the hose and a portion of the gasket. By these means the passage through the hose is kept open to its full extent. After the sleeves are in proper place they may be retained or fixed in suitable manner, as by means of a rivet 14, which on railroads is preferable to screws or the like. Likewise the screws 6 may be riveted to prevent working loose.

As shown in Fig. 4, the gasket has an extension 15 beyond the flange and adapted to fit into a socket or circular recess 16 in the connection 5. The ferrule may or may not be used. In this case also the gasket is combined with the hose, and the same tight joint is effected as in the case of the first-described gasket.

By the use of our invention a most reliable and tight joint is secured, so that the use of armored hose as a commercial article is rendered possible.

We claim—

1. In a hose-coupling, the combination of an armor, coupling members secured to such armor, and a flexible hose arranged within the armor and provided with a flexible, integral gasket extending from the hose in the manner of a flange, said gasket coöperating with said members; substantially as described.

2. In a hose-coupling, the combination, with the coupling members, of a flexible hose and a flexible gasket secured to the hose and coöperating with said members, whereby the hose may be flexed and used generally without liability of leakage between the hose and the gasket; substantially as described.

3. In a hose-coupling, the combination, with the coupling members, of a flexible hose and a flexible gasket having a cylindrical body portion secured to the hose and having a flange portion to coöperate with said members, whereby all leakage between the gasket and hose is prevented; substantially as described.

4. The combination of a flexible hose having an armor, a sleeve screwing onto said armor, and a flexible gasket forming an integral part of the hose to thereby prevent leakage between itself and the hose; substantially as described.

5. The combination of a hose having a screw-threaded armor, a sleeve having internal screw-threads to receive said armor, and a gasket vulcanized onto the exterior of the hose and fitting snugly within the sleeve, said gasket having a flange extending laterally over the ends of the sleeve; substantially as described.

6. In a hose-coupling, the combination of an armor, coupling members or heads secured thereto, a flexible hose arranged within the armor and having a resilient gasket forming an integral part of the hose to thereby prevent leakage between itself and the hose, and a ferrule fitted into the end of the hose; substantially as described.

7. In a hose-coupling, the combination, with the coupling members thereof, of a flexible hose having a flexible gasket vulcanized to the hose and forming an integral part thereof to prevent leakage between such hose and gasket, and a ferrule fitting into the hose and provided with a flange arranged over the ends of the hose and gasket; substantially as described.

8. In a hose-coupling, the combination with the hose 1, armor 2 thereon, sleeve 4 engaging the armor, a gasket integral with the hose and having a body portion 9 and flange 10 the coupling or connection 5, and means for securing the sleeve to said connection; substantially as described.

9. In a hose-coupling, the combination with the hose 1, armor 2 thereon, sleeve 4 engaging the armor, a gasket fitting between the end of the hose and the sleeve and extending laterally over the end of the sleeve and a removable ferrule fitting inside the hose; substantially as described.

10. In a hose-coupling, the combination with the hose 1, armor 2 thereon, sleeves 4 engaging the armor, a gasket fitting with its body portion between the end of the sleeve with its flange 10 extending laterally over the end of the sleeve, and a ferrule having a body portion 12 fitting in the hose and a flange portion 13 resting over the ends of the hose and gasket; substantially as described.

11. In a hose-coupling, the combination of a hose having coupling members at the ends, and a gasket combined with the hose and consisting of a body portion extending beyond the end of the hose and having an intermediate right-angled flange portion extending laterally over the end of the coupling members; substantially as described.

12. The combination of a rubber hose adapted to convey fluids under pressure and made comparatively thin and insufficient to resist said pressure, an armor surrounding said hose to resist such pressure, coupling members secured to said armor, and an elastic gasket secured to the ends of said hose; substantially as described.

13. In a hose-coupling, the combination of a flexible armor, coupling members secured to the ends thereof, a flexible hose arranged within the armor, and having a resilient gasket forming an integral part of the hose, which gasket comprises a cylindrical body portion connected to the hose and provided with an annular portion; substantially as described.

14. In a hose-coupling, the combination of a flexible armor, coupling members secured to the ends thereof, a flexible hose arranged within the armor, and a flexible gasket combined with the hose and comprising a cylindrical body having an intermediate annular portion extending laterally over the end of the coupling members; substantially as described.

15. In a hose-coupling, the combination of a flexible armor adapted to resist the pressure conducted through the hose, coupling members secured to the ends of the armor, a flexible hose arranged loosely within the armor and of such thickness as to be insufficient to resist said pressure but retained by said armor, and an integral gasket on the ends of said hose and coöperating with said coupling members; substantially as described.

FREDERICK G. FRANKENBERG.
ALFRED P. MILLER.

Witnesses:
LOUIS B. ERWIN,
FLORENCE KING.